W. H. BARNS.
Drinking Fountains.

No. 154,823.  Patented Sept. 8, 1874.

Witnesses  
Philip F. Larner  
A. B. Cauldwell

Inventor.  
William H. Barns,  
By McC—  
Attorney

UNITED STATES PATENT OFFICE.

WILLIAM H. BARNS, OF NEW LONDON, CONNECTICUT.

IMPROVEMENT IN DRINKING-FOUNTAINS.

Specification forming part of Letters Patent No. 154,823, dated September 8, 1874; application filed August 12, 1874.

*To all whom it may concern:*

Be it known that I, WILLIAM H. BARNS, of the city and county of New London, in the State of Connecticut, have invented certain new and useful Improvements in Drinking-Fountains.

My improvements have for their object the automatic supply of water to drinking-fountains for horses and cattle; and they relate to such fountains as are capable of being supplied by water under more or less pressure.

Heretofore the supply of water to tanks and cisterns has been automatically controlled by means of an auxiliary water-receptacle, capable of vertical movement, and arranged to actuate the valves controlling the passage of water from the immediate source of supply to the said auxiliary receptacle. Such apparatus necessitates the employment of flexible pipe-connections between the auxiliary receptacle and the tank or cistern, and with such, a system of jointed lever-connections, between the said receptacle and the valve-rod, are essential, and have been heretofore used.

My invention consists in a novel combination of a drinking trough or bowl, capable in whole or in part of vertical movement independent of its sustaining structure, with a water-delivery pipe and a valve connected therewith, provided with a spindle, and arranged so that the water-pressure at the valve will force the spindle upward against the tank or trough, whereby the vertical movement of the trough or bowl will open or close the valve, or permit it to be opened or closed, by the water-pressure at the valve; and I do hereby declare that the following specification, taken in connection with the drawings furnished, and forming a part of the same, is a clear and true description thereof, and of drinking-fountains embodying my invention.

Figure 1:
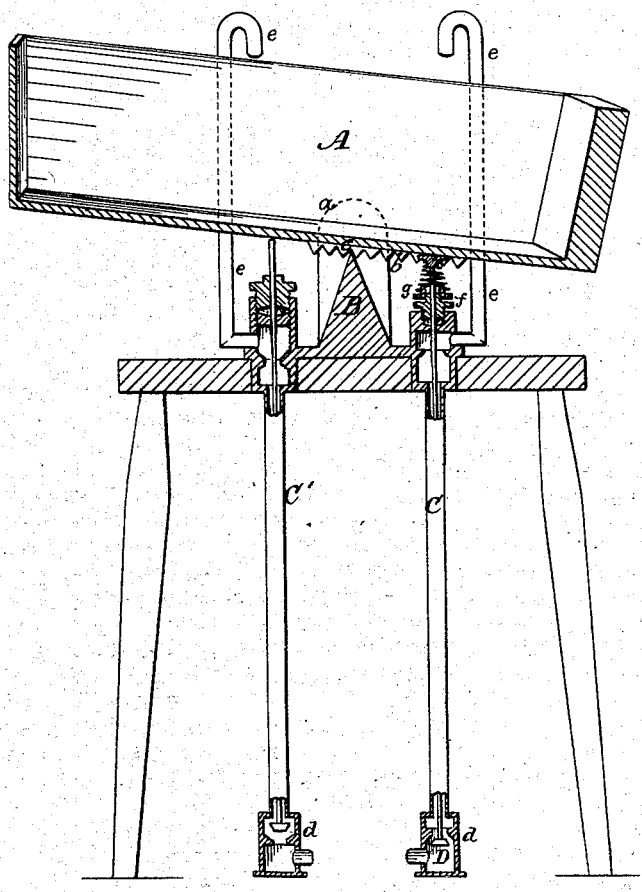
Figure 2:
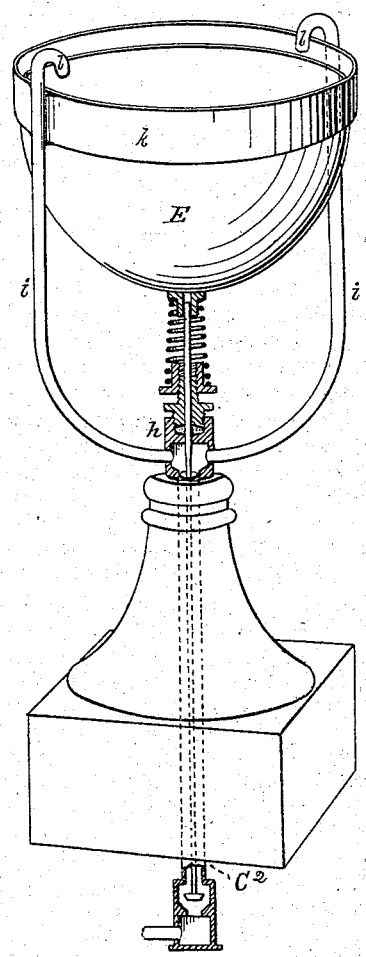

Referring to the drawings, Figure 1 represents, partly in perspective and partly in section, a drinking-trough for horses and cattle, which illustrates my invention applied in two forms. Fig. 2 represents, partly in perspective and partly in section, a drinking-urn, illustrating the application of my invention to that form of water-receptacle.

The trough A in Fig. 1 may be constructed of any suitable material, although cast-iron is preferable for economic reasons. It is mounted upon the edge of a vertical fulcrum-block, B, as shown, which is provided at each end with the upwardly-projecting lugs or ears $a$, for the purpose of preventing the trough from lateral displacement. For the purpose of preventing longitudinal displacement of the trough the latter is provided with the lateral grooves $b$, which engage with the bearing-edge of the fulcrum-block B at $c$, as shown. These grooves $b$ are located on the one side of the longitudinal center of the trough, and for purposes of longitudinal adjustment of the trough on the fulcrum several of said grooves are provided. One end of the trough (that which is nearest the bearing-grooves) is weighted so as to be heavier than the opposite end, and enable it to be depressed, regardless of the fact that the longest portion of the trough is on the opposite side of the fulcrum-bearing. This excessive weight may be attained by having that end of the trough cast with a greater proportion of metal than the opposite end, or separate weights may be placed in the trough or secured to its outer surfaces. When empty, the weighted end will be lower than the opposite end; but as water is placed in the trough it is gradually raised by the preponderance of water on the opposite side of the fulcrum-bearing, and assumes a horizontal position. C and C' denote two vertical supply-pipes, provided with proper connections at their base for uniting with the underground main or one of its branches. Both of these pipes terminate at a point below but adjacent to the bottom of the trough, and are surmounted with T-fittings and delivery gooseneck pipes, as at $e$. Within the fitting $d$ on pipe C is a spindle-valve, at D, which is opened against the pressure of the water in the pipe. Said valve is provided with a suitable stuffing-box, adapted to allow free vertical movement of the spindle. On top of the stuffing-box is a neck, $f$, provided with an exterior screw-thread, on which is an adjusting-nut, $g$. Surrounding the spindle of the valve D is an expansive spiral spring surmounted by a cap, into which said spindle extends, and to which it is attached. The lifting force of the spring may be readily adjusted by means of the adjusting-nut $g$. The cap on top of the valve-spindle, when the valve is closed, is closely adjacent to the under side of the trough, when the latter is maintained in a horizontal position; but when that end of the trough is depressed and in contact with the spindle the valve is thereby opened and water is admitted through the valve into the trough by the way of the goose-neck communicating therewith. It is obvious, after sufficient water has been received by the trough, that it will assume a horizontal position, relieve the valve-spindle of its pressure, and cut off further delivery. When from use the quantity of water has been reduced sufficiently to allow the weighted end to descend, the valve is again opened and a new supply furnished, as before. The supply of water, in this instance, is controlled purely by the movement of one end of the trough, and the movement of the opposite end is as readily available for the same purpose. The pipe $C^1$ is provided with a similar valve and spindle, differing from the other in that it is opened by the pressure of the water, as indicated by the construction shown. In the first instance, the valve-spindle must be depressed, while in this case it must be permitted to rise. Therefore, when the trough is empty and depressed at the weighted end, the valve is free to be opened, and water flows by the way of the connecting goose-neck into the trough until, the weighted end being overcome by the greater weight of water in the trough on the opposite side of the fulcrum, the trough assumes a horizontal position, pressing downward on the spindle, and closing the valve. Either of these forms of valve may be singly employed, or both may be provided, as shown, and they will harmoniously operate to the same end.

It will be seen that it is desirable to have a means for adjusting the depressing power of the weighted end, in order to provide for proper action under the varied pressures of water in the pipes C or $C^1$. Should separate detachable weights be employed, this adjustability may be readily effected by adding or removing them; but when in a cast-iron trough one end has more metal than the other, the several grooves admit of the varied position of the trough with relation to the bearing-edge of the fulcrum. When but one of these valves is employed, a stop or rest will be placed below both ends of the trough, to prevent any undue downward movement, and such stops may well be provided in all cases.

As the form of the elongated straight-sided trough commonly used is sometimes deemed objectionable, and as some particular localities may not admit of that form being employed, I illustrate in Fig. 2 the application of my invention to a water-receptacle in the form of an urn or vase, which may be made in great variety of design. These are well adapted for private use or for public parks.

In this figure, E denotes a bowl-shaped receptacle, which is mounted upon the sustaining structure, so that it may readily be removed therefrom at pleasure, and is capable of independent vertical movement. The main base, in this instance, is square, and surmounted by a circular member, through which the pipe $C^2$ extends from connections with the ground-pipes. On the upper end of pipe $C^2$ is an enlarged section of pipe, as at $h$, from which two sustaining-pipes, as at $i$, extend outward and upward. An annular band or rim, $k$, of an interior diameter slightly greater than the exterior diameter of the bowl E, is secured to the pipes $i$ at their upper ends. Each of said pipes has a delivery-nozzle at $l$, which directs the water downward into the bowl. The pipe $C^2$ contains a valve, which is opened by the upward, and closed by the downward, movement of its spindle. The spindle is inclosed by an expansive spiral spring, and surmounted by a cap. As before explained in connection with one of the valve-spindles in Fig. 1, a nut is provided, whereby the pressure force of the spring may be graduated. The cap on the spindle will preferably be wholly maintained by the spring, in order that it be capable of movement to some extent independent of the spindle. On this cap the bowl E rests, and its weight is borne by the spring. When empty, the bowl will be maintained by the spring, and kept from contact with the upper end of the valve-spindle, thereby permitting the valve to be lifted by the pressure of water in the pipe, and allowing the water to flow, by way of pipes $i$, into the bowl until the water therein is sufficient in weight to overcome the power of the spring, depress the spindle, and close the valve, the latter continuing closed until the water has been sufficiently removed from the bowl to allow the spring to lift it, and allow the valve to be reopened, as before.

It will be obvious that the springs should be made of brass, or similar non-corrosive metal, and that they and the spindles should be protected by a loose inclosing-sleeve, to prevent undue accumulation of dirt, &c., thereon.

In practice, it will be seen that economy in the use of water is attained, and objectionable overflow practically avoided.

Instead of employing long valve-spindles, as shown, shorter ones may be used, with valve-seats in the T-connections at the upper ends of the pipes C and $C^1$.

Having thus described my invention, I claim as new and desire to secure by Letters Patent—

1. The combination, with a drinking trough or bowl, capable in whole or in part of vertical movement independent of its sustaining structure, with a water-delivery pipe and a valve connected therewith, provided with a spindle, and arranged so that the water-pressure at the valve will force the spindle upward against the trough, substantially as described, whereby the downward movement of the trough or bowl will force the spindle downward and close the valve when the trough is properly supplied.

2. A tilting drinking-trough, weighted at one end, and unevenly balanced on a fulcrum, in combination with a delivery-pipe, and a valve located therein, provided with a spindle, which is forced by the pressure of water at the valve upward against the tank adjacent to its weighted end, substantially as described, whereby, when the requisite quantity of water is contained in the trough, the weighted end will be elevated, and permit the valve to close.

WILLIAM H. BARNS.

Witnesses:
WILLIAM BELCHER,
C. W. BUTLER.